United States Patent
Chang et al.

(10) Patent No.: US 11,797,226 B2
(45) Date of Patent: Oct. 24, 2023

(54) SOLID STATE DISK DEVICE

(71) Applicant: Wiwynn Corporation, New Taipei (TW)

(72) Inventors: Shih-Hui Chang, New Taipei (TW); Ping-Sheng Yeh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 249 days.

(21) Appl. No.: 17/504,446

(22) Filed: Oct. 18, 2021

(65) Prior Publication Data
US 2023/0035521 A1    Feb. 2, 2023

(30) Foreign Application Priority Data
Jul. 29, 2021    (TW) .................................. 110127891

(51) Int. Cl.
*G11C 7/00*    (2006.01)
*G06F 3/06*    (2006.01)
*G06F 3/02*    (2006.01)

(52) U.S. Cl.
CPC .......... *G06F 3/0658* (2013.01); *G06F 3/0227* (2013.01); *G06F 3/0619* (2013.01)

(58) Field of Classification Search
CPC ..... G06F 3/0658; G06F 3/0227; G06F 3/0619
USPC .................................................. 365/189.011
See application file for complete search history.

(56) References Cited

U.S. PATENT DOCUMENTS

| | | | | |
|---|---|---|---|---|
| 6,587,909 B1 * | 7/2003 | Olarig | ................. | G06F 13/4081 710/302 |
| 6,980,465 B2 * | 12/2005 | Taussig | .................... | G11C 8/10 365/158 |
| 7,610,447 B2 * | 10/2009 | Perego | .................. | G06F 13/409 710/305 |
| 8,060,141 B2 * | 11/2011 | Lo | ........................ | G06K 7/0008 455/435.1 |
| 8,417,869 B2 * | 4/2013 | Chen | ................... | G06F 12/0246 711/170 |
| 8,725,946 B2 * | 5/2014 | Petersen | ............... | G06F 3/0685 714/22 |
| 8,837,248 B2 * | 9/2014 | Yu | ........................ | G11C 5/143 365/228 |

(Continued)

FOREIGN PATENT DOCUMENTS

| | | | |
|---|---|---|---|
| CN | 112068645 A | | 12/2020 |
| CN | 112749036 A | | 5/2021 |
| JP | 5175465 B2 | * | 4/2013 |

*Primary Examiner* — Viet Q Nguyen
(74) *Attorney, Agent, or Firm* — Winston Hsu

(57) ABSTRACT

A solid state device for a computer system is disclosed. The computer system includes a detecting module for detecting a connection state of a connector of a backplane of the computer system. The solid state device includes a memory module, configured to store data; a connection module, configured to connect the connector of the backplane of the computer system; and a controller module, coupled to the memory module and the connection module, configured to write data into the memory module according to a writing notification from the computer system when the connection state between the connection module and the connector of the computer system is changed from a first connection state to a second connection state, and to notify the computer system to unlock the connector of the computer system after finishing writing the data.

8 Claims, 3 Drawing Sheets

(56) References Cited

U.S. PATENT DOCUMENTS

| | | | | |
|---|---|---|---|---|
| 8,850,114 | B2* | 9/2014 | Rosenband | G06F 3/0688 |
| | | | | 711/114 |
| 11,023,140 | B2* | 6/2021 | Lendvay | G06F 3/0656 |
| 11,275,699 | B2* | 3/2022 | Chen | G06F 3/0605 |
| 2009/0181717 | A1* | 7/2009 | Lo | G06K 7/0008 |
| | | | | 455/550.1 |
| 2014/0087593 | A1* | 3/2014 | Finona | H01R 13/6473 |
| | | | | 439/660 |

* cited by examiner

SOLID STATE DISK DEVICE

BACKGROUND OF THE INVENTION

1. Field of the Invention

The present invention relates to a solid state disk device, and more particularly, to a solid state disk device which supports a hot-plugging mechanism.

2. Description of the Prior Art

Conventional hot-plugging technology of a solid state disk device enables sudden removal of the solid state disk, allowing the solid state disk to be removed from the computer system or connected to the computer system via hot-plugging technology even when the computer system is in operation. Before the user removes the solid state disk from the computer system, if the data in the solid state disk are not written into the non-volatile memory, the power loss protection mechanism may be activated. This results in a few minutes of recovery time to write the data into the non-volatile memory when the computer system reboots, which affects the connection speed. In addition, when the recovery time is too long, the solid state disk cannot respond to the computer system, causing a dropped disk.

Therefore, improvements are necessary to the conventional technique.

SUMMARY OF THE INVENTION

In light of this, the present invention provides a solid state disk device which supports hot-plugging technology to solve the above problems.

The present invention discloses a solid state disk device for a computer system, wherein the computer system comprises a detecting module for detecting a connection state of a connector of a backplane of the computer system. The solid state disk device comprises: a memory module, configured to store data; a connection module, configured to connect the connector of the backplane of the computer system; and a controller module, coupled to the memory module and the connection module, configured to write data into the memory module according to a writing notification from the computer system when the connection state between the connection module and the connector of the computer system is changed from a first connection state to a second connection state, and to notify the computer system to unlock the connector of the computer system after finishing writing the data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
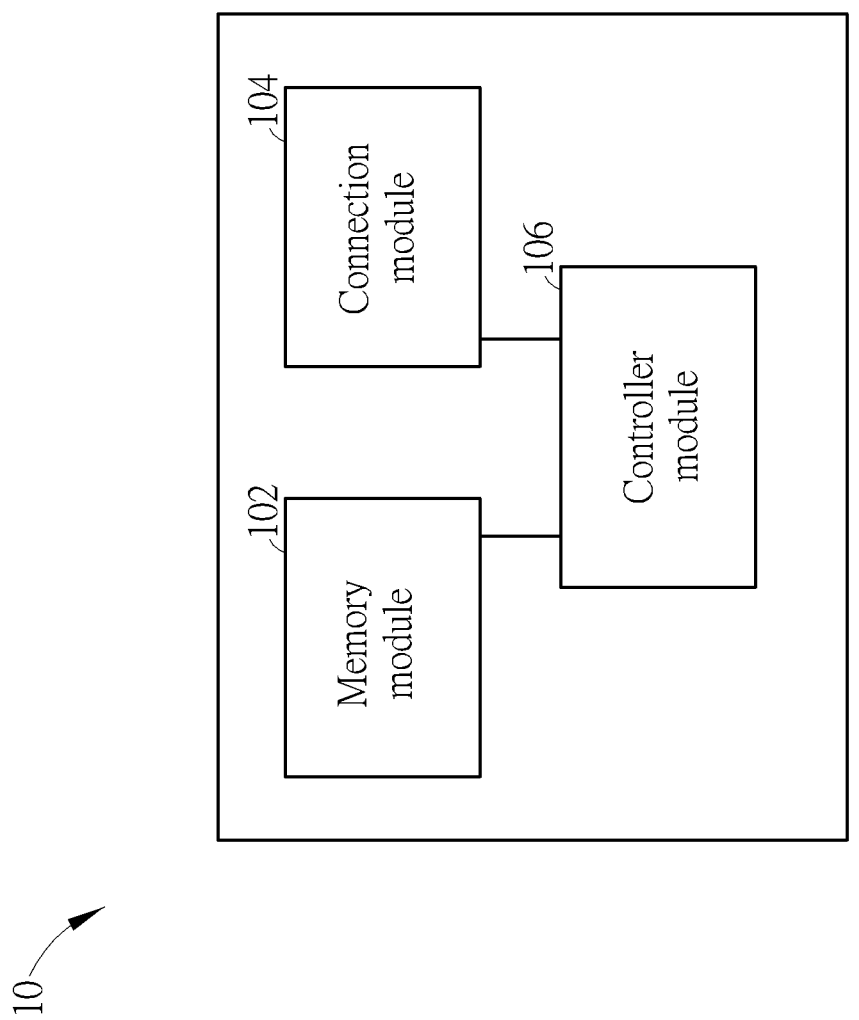
FIG. 1 is a schematic diagram of a solid state disk device according to an embodiment of the present invention.

FIG. 1 is a schematic diagram of a solid state disk device 10 according to an embodiment of the present invention. The solid state disk device 10 supports a hot-plugging mechanism and can be applied to a computer system (not illustrated in the figures), and includes a memory module 102, a connection module 104 and a controller module 106. The computer system may be a device or software with a kernel subsystem of an operating system, and is utilized as a communication interface between the computer system and the solid state disk device 10. In addition, the computer system may include a detecting module (not illustrated in the figures) for detecting a connection state of a connector of a backplane of the computer system, wherein the backplane of the computer system may be a flexible printed circuit (FPC) of a hard disk drive.

The memory module 102 of the solid state disk device 10 is configured to store data, e.g. the memory module 102 may be a non-volatile memory. The connection module 104 is configured to connect the connector of the backplane of the computer system. In an embodiment, the connection module 104 of the solid state disk device 10 may be a pitch, and the connector of the computer system may be a slot corresponding to the pitch to connect the connection module 104. The controller module 106 is coupled to the memory module 102 and the connection module 104, and is configured to write data into the memory module 102 according to a writing notification from the computer system when the connection state between the connection module 104 and the connector of the computer system is changed from a first connection state to a second connection state, and to notify the computer system to unlock the connector of the computer system after finishing writing the data. In other words, after the solid state disk device 10 finishes writing the data, the solid state disk device 10 is ready to enter a shutdown state. In addition, when the connection module 104 is in the first connection state and the second connection state, the solid state disk device 10 is connected to the computer system via a hardware connection for signal communication. Therefore, when a user wants to remove the solid state disk device 10, the computer system may notify the solid state disk device 10 to write the data into the memory module 102 according to the change in connection state with the solid state disk device 10, allowing the removal of the solid state disk device 10 without data loss or a dropped disk.

Figure 2:
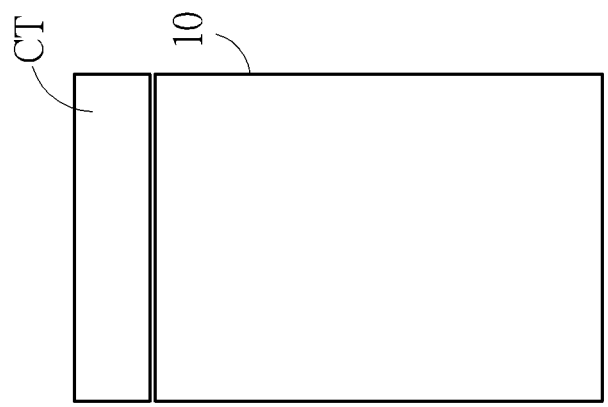
FIGS. 2-4 are schematic diagrams of a connection state between the solid state disk and a computer system according to an embodiment of the present invention.
Figure 3:
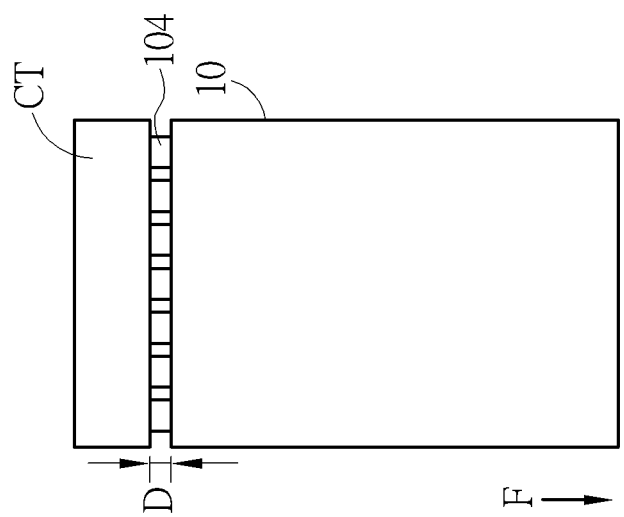
Figure 4:
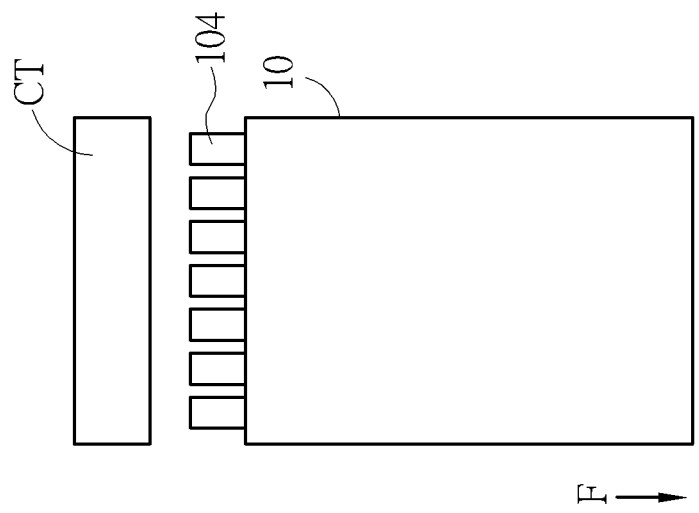
Figure 5:
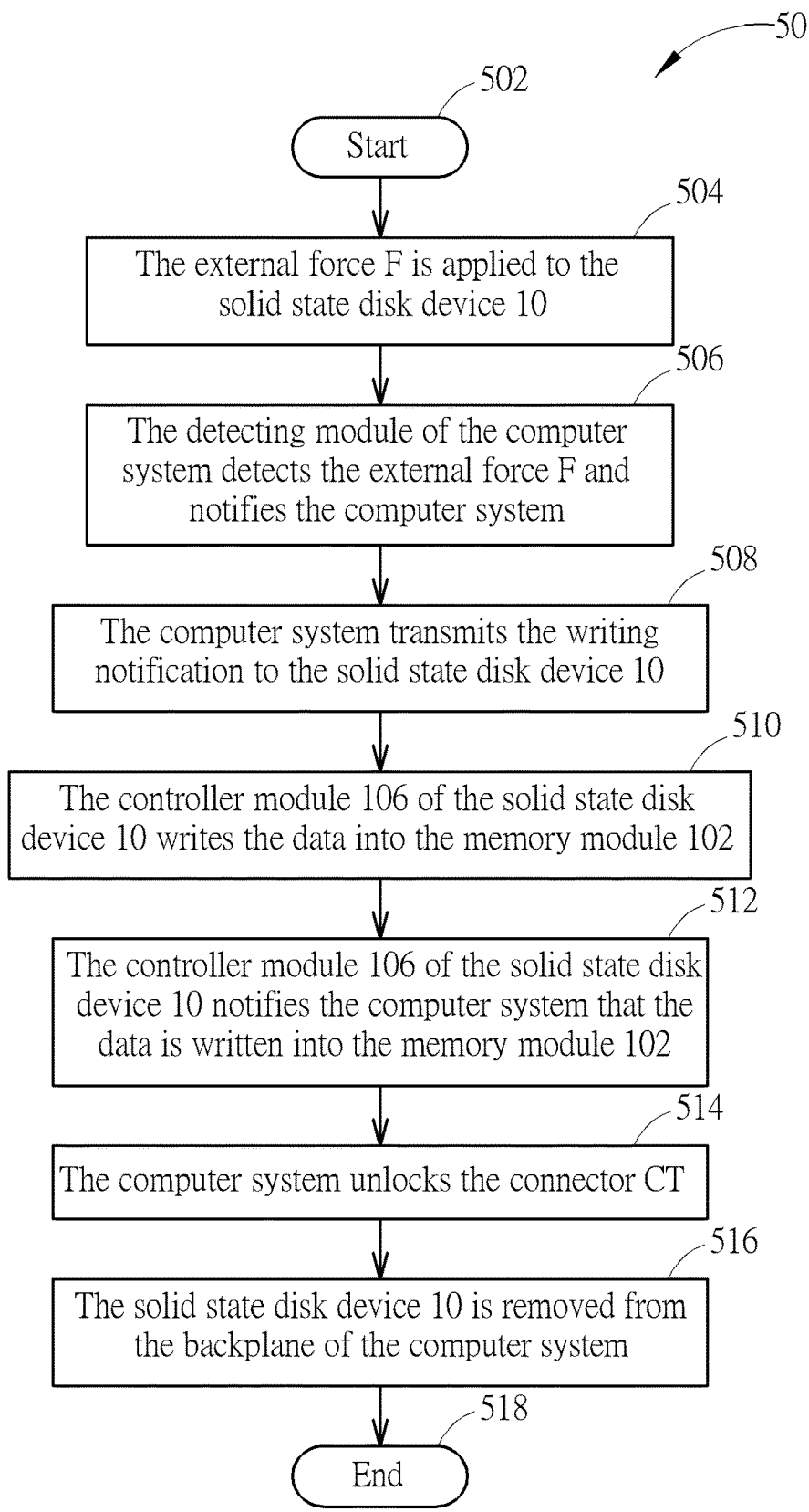
FIG. 5 is a schematic diagram of an operating method according to an embodiment of the present invention.

Refer to FIGS. 2-4 for an illustration of different connection states of the computer system and the solid state disk device 10. As shown in FIG. 2, the solid state disk device 10 according to an embodiment of the present invention is connected to a connector CT of the computer system and is locked on the backplane of the computer system. In an embodiment, the solid state disk device 10 may be locked on the backplane via a latch. When an external force F is enforced on the solid state disk device 10 by a user, the solid state disk device 10 cannot be removed, since the solid state disk device 10 is locked on the connector CT. In FIG. 3 the solid state disk device 10 is locked on the connector CT and is slightly moved by a specific displacement D, e.g. 1 millimeter (mm). In an example, the solid state disk device 10 may be mounted on a slide tray to be locked on the connector CT. When the solid state disk device 10 is enforced by the external force F and the connection state between the connector CT and the solid state disk device 10 detected by the detecting module is changed, i.e. the specific displacement D is generated by the external force F, the detecting module may notify the computer system accordingly. The computer system therefore transmits the writing notification to the controller module 106 of the solid state disk device 10, and then the controller module 106 writes the data into the memory module 102. After the solid state disk device 10 finishes writing the data, the controller module 106 of the solid state disk device 10 notifies the computer system to unlock the connector CT, allowing the user to smoothly remove the solid state disk device 10 from the connector CT (as shown in FIG. 4).

Notably, when the latch of the computer system is unlocked, the computer system may instantly notify the user to remove the solid state disk device 10, e.g. by displaying a notification window on the OS or utilizing a notification beep for notifying the user, but the invention is not limited thereto.

In an embodiment, when the connection module 104 of the solid state disk device 10 is the pitch, a first contact area is formed between the connection module 104 and the connector CT of the computer system when in the first connection state; a second contact area is formed between the connection module 104 and the connector CT of the computer system when in the second connection state, and the first contact area is larger than the second contact area. More specifically, a buffer space exists when the solid state disk device 10 is disposed in the slide tray, such that the solid state disk device 10 may slightly move therein due to the external force. This changes the contact area formed between the pitch of the solid state disk device 10 and the connector CT. Therefore, the detecting module of the computer system may detect that the external force is applied to the solid state disk device 10.

In another embodiment, the pitch may be implemented by a pitch with pins of different lengths. When the external force is applied to the solid state disk device 10 and the connection module 104 is in the second connection state, the computer system may obtain the connection state of the connector CT according to specific connection signals of the pitch.

An operation of the hot-plugging mechanism of the solid state disk device 10 may be summarized as an operating method 50. The operating method 50 includes the following steps:

Step 502: Start;
Step 504: The external force F is applied to the solid state disk device 10;
Step 506: The detecting module of the computer system detects the external force F and notifies the computer system;
Step 508: The computer system transmits the writing notification to the solid state disk device 10;
Step 510: The controller module 106 of the solid state disk device 10 writes the data into the memory module 102;
Step 512: The controller module 106 of the solid state disk device 10 notifies the computer system that the data is written into the memory module 102;
Step 514: The computer system unlocks the connector CT;
Step 516: The solid state disk device 10 is removed from the backplane of the computer system;
Step 518: End.

Refer to the embodiments of the solid state disk device 10 mentioned above for a detailed description of the operation process of operating method 50, which will not be repeated herein for brevity.

Notably, the above embodiments illustrate concepts of the present invention. Those skilled in the art may make appropriate modifications. For example, the backplane of the computer system for locking the solid state disk, the connector of the backplane, and the displacement distance may be modified according to requirements of the user or the computer system, and are not limited to the above embodiments.

In summary, the present invention provides a solid state disk device for a computer system, wherein the computer system unlocks the connector of the computer system after the data is written into the memory module according to the change of the connection state between the solid state disk device and the computer system, such that the solid state disk device may be removed smoothly, preventing data loss or dropped disk.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A solid state disk device, for a computer system, wherein the computer system comprises a detecting module for detecting a connection state of a connector of a backplane of the computer system, and the solid state disk device comprises:
   a memory module, configured to store data;
   a connection module, configured to connect the connector of the backplane of the computer system; and
   a controller module, coupled to the memory module and the connection module, configured to write data into the memory module according to a writing notification from the computer system when the connection state between the connection module and the connector of the computer system is changed from a first connection state to a second connection state, and to notify the computer system to unlock the connector of the computer system after finishing writing the data.

2. The solid state disk device of claim 1, wherein the solid state disk device is locked on the backplane via a latch.

3. The solid state disk device of claim 1, wherein when the connection module is a pitch, a first contact area is formed between the connection module and the connector of the computer system when in the first connection state; a second contact area is formed between the connection module and the connector of the computer system when in the second connection state, and the first contact area is larger than the second contact area.

4. The solid state disk device of claim 3, wherein when the connection module is in the first connection state and the second connection state, the solid state disk device is moved on a slide tray of the computer system.

5. The solid state disk device of claim 4, wherein a specific displacement is generated when the solid state disk device is in the second connection state.

6. The solid state disk device of claim 1, wherein when an external force is applied to the solid state disk device, the connection state is changed from the first connection state to the second connection state.

7. The solid state disk device of claim 1, wherein the solid state disk device supports a hot-plugging mechanism.

8. The solid state disk device of claim 1, wherein a hardware connection exists between the solid state disk device and the computer system in the first connection state and the second connection state.

* * * * *